United States Patent
Hirakawa et al.

(10) Patent No.: US 11,335,295 B1
(45) Date of Patent: May 17, 2022

(54) DEVICE AND METHOD FOR DRIVING A DISPLAY PANEL

(71) Applicant: Synaptics Incorporated, San Jose, CA (US)

(72) Inventors: Tomohiro Hirakawa, Chiba (JP); Takayuki Noto, Tokyo (JP); Masaaki Shiomura, Tokyo (JP); Hirokazu Hatayama, Kanagawa (JP); Yoriaki Miyoshi, Tokyo (JP); Keiichi Yoshida, Tokyo (JP); Hiroshi Shimura, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/339,803

(22) Filed: Jun. 4, 2021

(51) Int. Cl.
| G09G 3/36 | (2006.01) |
| G06F 3/01 | (2006.01) |
| G06F 3/044 | (2006.01) |
| G09G 3/3225 | (2016.01) |
| G09G 3/3266 | (2016.01) |
| G09G 3/3275 | (2016.01) |
| G06F 3/041 | (2006.01) |

(52) U.S. Cl.
CPC ......... *G09G 3/3688* (2013.01); *G06F 3/0412* (2013.01); *G09G 3/3677* (2013.01); *G06F 3/044* (2013.01); *G06F 2203/04108* (2013.01); *G09G 3/3225* (2013.01); *G09G 3/3266* (2013.01); *G09G 3/3275* (2013.01); *G09G 2310/0202* (2013.01); *G09G 2310/0245* (2013.01); *G09G 2310/08* (2013.01); *G09G 2320/0257* (2013.01); *G09G 2330/12* (2013.01); *G09G 2370/00* (2013.01)

(58) Field of Classification Search
CPC .. G09G 3/3688; G09G 3/3677; G09G 3/3266; G09G 3/3225; G09G 3/3275; G09G 2310/0245; G09G 2310/0202; G09G 2310/08; G09G 2320/0257; G09G 2330/12; G09G 2370/00; G06F 3/0412; G06F 3/044; G06F 2203/04108
See application file for complete search history.

(56) References Cited

U.S. PATENT DOCUMENTS

| 2007/0164969 A1* | 7/2007 | Kim ..................... G09G 5/008 345/99 |
| 2012/0147195 A1* | 6/2012 | Jang ..................... G09G 5/363 348/180 |
| 2014/0347340 A1* | 11/2014 | Tse ...................... G06F 11/0757 345/212 |

(Continued)

*Primary Examiner* — David Tung
(74) *Attorney, Agent, or Firm* — Ferguson Braswell Fraser Kubasta PC (57) ABSTRACT

A processing system includes a timing controller and source driver circuitry. The timing controller is configured to stop scanning of a plurality of gate lines of a display panel in response to a detection of a communication failure between the processing system and a controller. The source driver circuitry is configured to update a plurality of display elements of the display panel to cause a black display in response to expiration of a time limit after the detection of the communication failure. The timing controller may be further configured to resume the scanning of the plurality of gate lines in response to the expiration of the time limit.

18 Claims, 8 Drawing Sheets

(56) References Cited

U.S. PATENT DOCUMENTS

| | | | |
|---|---|---|---|
| 2015/0268777 A1* | 9/2015 | Okamura | G06F 3/0446 345/205 |
| 2016/0104418 A1* | 4/2016 | Keum | G09G 3/3208 345/76 |
| 2018/0218667 A1* | 8/2018 | Yamazumi | G09G 5/393 |
| 2021/0225315 A1* | 7/2021 | Fu | G09G 3/36 |

* cited by examiner

DEVICE AND METHOD FOR DRIVING A DISPLAY PANEL

FIELD

The disclosed technology generally relates to a device and method for driving a display panel.

BACKGROUND

A display device configured to display an image on a display panel (e.g., a liquid crystal display (LCD) panel, an organic light emitting diode (OLED) display panel, and other types of display panels) may be controlled by an external controller. In such implementations, a communication failure between the display device and the external controller may cause a corrupted display image.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In one or more embodiments, a processing system is provided. The processing system includes a timing controller and source driver circuitry. The timing controller is configured to stop scanning of a plurality of gate lines of a display panel in response to a detection of a communication failure between the processing system and an external controller. The source driver circuitry is configured to update a plurality of display elements of the display panel to cause a black display in response to expiration of a time limit after the detection of the communication failure.

In one or more embodiments, a display device is provided. The display device includes a display panel and a processing system. The display panel includes a plurality of display elements. The processing system includes a timing controller and source driver circuitry. The timing controller is configured to stop scanning of a plurality of gate lines of the display panel in response to a detection of a communication failure between the processing system and an external controller. The source driver circuitry is configured to update the plurality of display elements to cause a black display in response to expiration of a time limit after the detection of the communication failure.

In one or more embodiments, a method for driving a display panel is provided. The method includes stopping scanning of a plurality of gate lines of a display panel in response to a detection of a communication failure between an external controller and a processing system configured to drive the display panel. The method further includes updating a plurality of display elements of the display panel to cause a black display in response to expiration of a time limit after the detection of the communication failure.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

A display panel (e.g., an LCD panel, an OLED display panel, and other types of display panels) may be driven by a processing system that may include one or more integrated circuits (ICs), such as a display driver integrated circuit (DDIC), a touch and display driver integrated circuit (TDDI) or other types of ICs. The processing system may be configured to display a desired image on the display panel under control of an external controller coupled to the processing system via a communication link. The term "coupled" as used herein means connected directly to or connected through one or more intervening components or circuits. Examples of the external controller include a host, an application processor, or other types of controller or processor configured to control the processing system. In various implementations, the external controller is configured to provide image data to the processing system, and the processing system is configured to drive the display panel based on the image data. The external controller may be further configured to provide sync signals (e.g., a horizontal sync signal and a vertical sync signal) to the processing system, and the processing system may be configured to generate one or more internal sync signals (e.g., an internal horizontal sync signal and an internal vertical sync signal) in synchronization with the sync signals received from the external controller. The generated internal sync signals may be used for timing control in the processing system.

A communication failure between the processing system and the external controller may cause a corrupted display image on the display panel. The communication failure may be an unplanned interruption in the transmission of data between the processing system and the external controller. Examples of events that cause the communication failure may include an electrostatic discharge (ESD) strike, noise, unintended disconnection of a physical cable of the communication link. The ESD strike may be an event in which a current spike caused by ESD is applied to the processing system, the external controller, and/or the communication link between the processing system and the external controller. When the communication failure causes unsuccessful reception of image data, the processing system cannot update display elements with proper drive voltages, causing a corrupted display image. The communication failure may also cause unsuccessful reception of the sync signals, which may make it impossible to generate internal sync signals (e.g., an internal horizontal sync signal and an internal vertical sync signal) at proper timing in the processing system. The lack of internal sync signals may cause display image corruption.

The time duration during which the communication failure lasts may depend on the cause of the communication failure. An ESD-related communication failure typically lasts for several to several tens to milliseconds. Meanwhile, a communication failure resulting from unintended disconnection of the physical cable may last for several minutes or longer.

The present disclosure provides an improved scheme to mitigate undesired effects of the communication failure depending on the time duration of the communication failure. In various embodiments, a processing system is configured to stop scanning of gate lines of the display panel in response to a detection of a communication failure between the processing system and an external controller. Stopping the scanning of the gate lines allows keeping the display image unchanged on the display panel, avoiding the display panel being updated with a corrupted image. The stop of the scanning of the gate lines may however cause charge retention in display elements of the display panel, which may cause deterioration (e.g., burn-in) of the display panel. To mitigate the charge retention, source driver circuitry may be configured to drive the display elements of the display panel to cause a black display in response to expiration of a time limit after the detection of the communication failure. Updating the display elements to cause the black display may discharge at least part of charges retained by the display elements, effectively suppressing the deterioration of the display panel.

Figure 1:
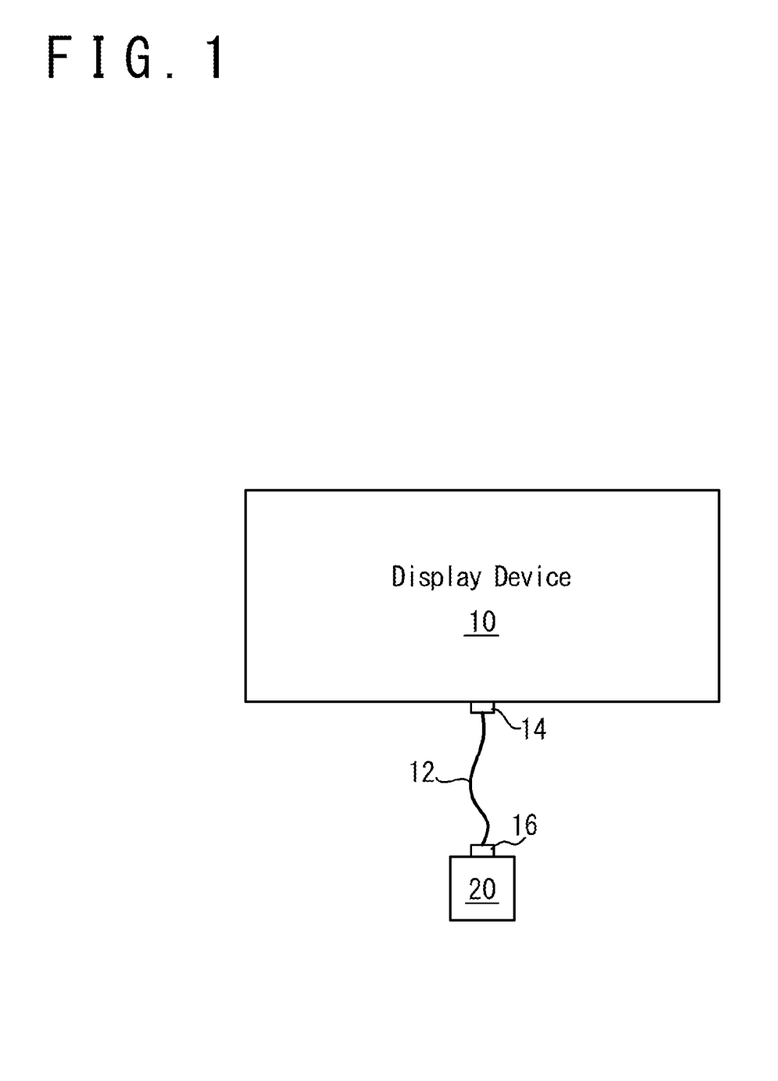
FIG. 1 illustrates an example implementation of a display device, according to one or more embodiments.

FIG. 1 illustrates an example implementation of a display device 10, according to one or more embodiments. In the illustrated embodiment, the display device 10 is coupled to a controller 20 that is external to the display device 10. The controller 20 is configured to control the display device 10. The display device 10 may be configured as a central information display (CID) used in automobile applications. Alternatively, the display device 10 may be a different type of display, such as a computer monitor display, a television, and so forth. The controller 20 may be configured to provide image data and control signals (e.g., a sync signal, a clock signal, and a data enable signal) to the display device 10. The controller 20 may be a host, an application processor, or other types of controller or processor.

A physical cable 12 is used to provide a communication link between the display device 10 and the controller 20. The physical cable 12 includes a first connector 14 detachably coupled to the display device 10 at one end, and a second connector 16 detachably coupled to the controller 20. In one implementation, the physical cable 12 may be, but not limited to, a high-definition multimedia interface (HDMI) cable adapted to communications based on low voltage differential signaling (LVDS). Other types of cables may be used instead. In other embodiments, the communication link between the display device 10 and the controller 20 may be wireless.

Figure 2:
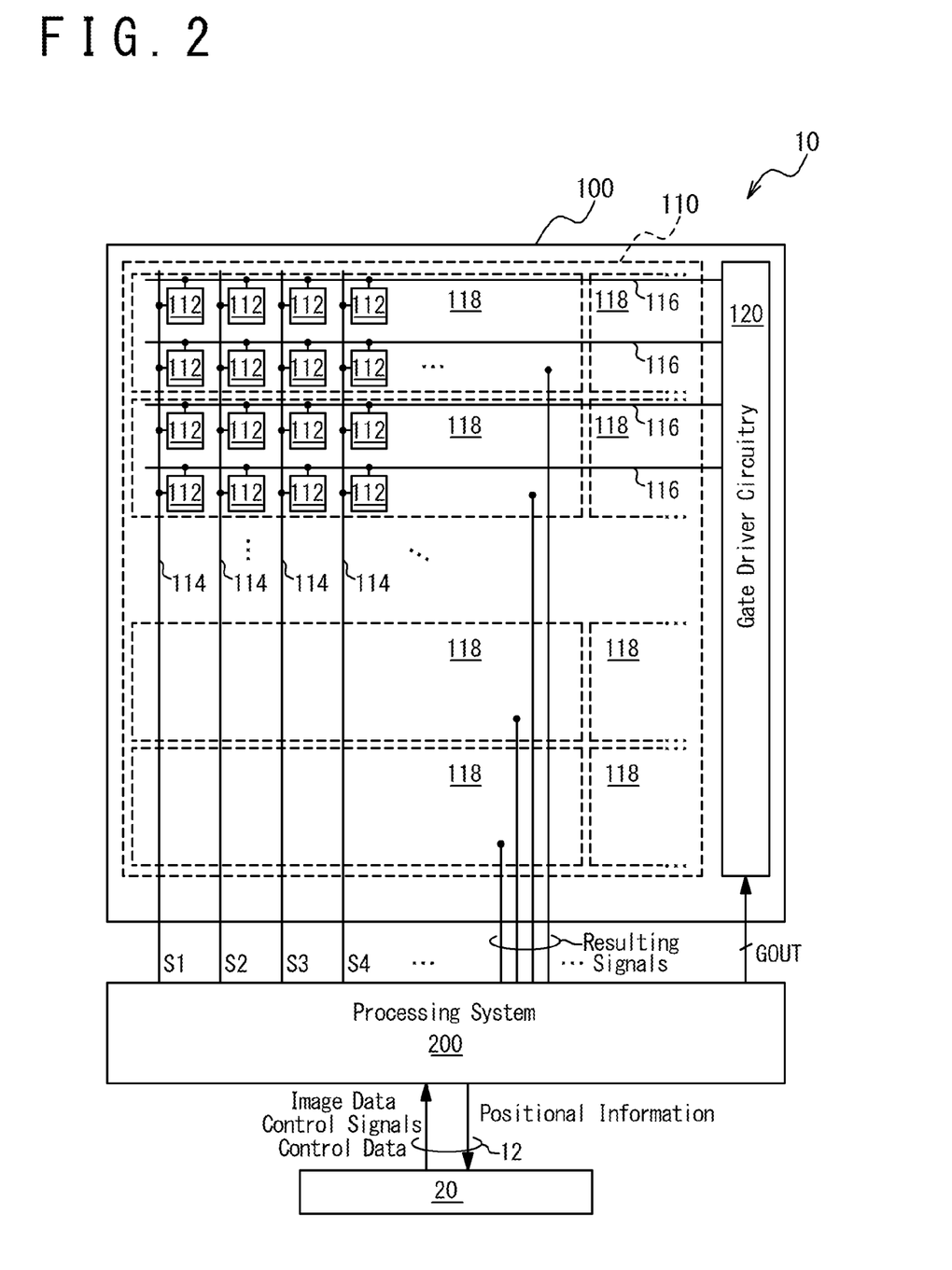
FIG. 2 illustrates an example configuration of the display device, according to one or more embodiments.

FIG. 2 illustrates an example configuration of the display device 10, according to one or more embodiments. In the illustrated embodiment, the display device 10 includes a display panel 100 and a processing system 200. The display panel 100 may be an LCD panel, an OLED display panel, or a different type of display panel. The processing system 200 may include one or more integrated circuits (ICs), such as a display driver integrated circuit (DDIC), a touch and display driver integrated circuit (TDDI) or other types of ICs.

The display panel 100 includes a display region (or active region) 110. The display region 110 may include a plurality of display elements 112, a plurality of source lines 114 (which may be also referred to as data lines), and a plurality of gate lines 116 (which may be also referred to as scan lines). Each display element 112 may be coupled to a corresponding source line 114 and gate line 116. In embodiments where an LCD panel is used as the display panel 100, the display elements 112 may each comprise a pixel electrode, a select transistor, and a hold capacitor. In embodiments where an OLED display panel is used as the display panel 100, the display elements 112 may each comprise a light emitting element, a select transistor, and a hold capacitor.

In the following, a set of display elements 112 coupled to a gate line 116 may be collectively referred to as "horizontal line." The display elements 112 of the display panel 100 are updated on a "horizontal line" basis. Update of display elements 112 of a horizontal line may be achieved by selecting the corresponding gate line 116 and providing drive voltages to the display elements 112 coupled to the selected gate line 116.

The display panel 100 may further include gate driver circuitry 120 configured to scan the gate lines 116 during the update of the display elements 112 of the display panel 100. The scanning of the gate lines 116 may include sequentially selecting or asserting the gate lines 116. The gate driver circuitry 120 is configured to scan the gate lines 116 in response to a set of gate control signals GOUT received from the processing system 200. The display panel 100 may include various interconnections other than the source lines 114 and the gate lines 116 depending on the configuration of the display elements 112. In some implementations, the display panel 100 may further include a plurality of multiplexers each associated with two or more source lines 114 and configured to selectively connect one of the associated source lines 114 to the processing system 200.

The display panel 100 may further include a plurality of sensor electrodes 118 coupled to the processing system 200. The sensor electrodes 118 may be used for proximity sensing to detect an input object in a sensing region of the display panel 100, where the sensing region may be defined to overlap or coincide with the display region 110. Examples of the input object includes user's fingers and styli. While eight sensor electrodes 118 are illustrated, those skilled in the art would appreciate the display panel 100 may include more than or less than eight sensor electrodes 118. The sensor electrodes 118 may also be used for display updating. For example, in embodiments where the display panel 100 is configured as an LCD panel, the sensor electrodes 118 may also be used as common electrodes. In such embodiments, the sensor electrodes 118 may be driven with a common voltage $V_{COM}$ in updating the display panel 100.

The processing system 200 is configured to update the display panel 100 based on image data received from the controller 20. The image data may include graylevels defined for the respective display elements 112 of the display panel 100. A graylevel for a display element 112 may correspond to desired brightness of the display element 112. In various embodiments, the processing system 200 is configured to update the respective display elements 112 of the display panel 100 with drive voltages corresponding to the graylevels specified by the image data for the respective display elements 112. In one implementation, the processing system 200 is configured to output the drive voltages to the respective display elements 112 from a set of source outputs S1 to Sm (four source outputs S1 to S4 are illustrated in FIG. 2).

The processing system 200 is further configured to provide the gate control signals GOUT to the gate driver circuitry 120. The gate control signals GOUT may include a gate start pulse signal that indicates a start of scanning of the gate lines 116 and a set of multi-phase gate clocks used for clocking of the scanning of the gate lines 116.

The processing system 200 may be further configured to detect a contact or approach of an input object to the sensing region (which may overlap or coincide with the display region 110) of the display panel 100 through proximity sensing. The proximity sensing may be based on resulting signals acquired or received from the sensor electrodes 118. The proximity sensing may be achieved through absolute capacitance sensing (or self-capacitance sensing) based on the absolute capacitances (or self-capacitances) of the sensor electrodes 118, the absolute capacitances being determined based on the resulting signals. The display panel 100 may further comprise transmitter electrodes that are not illustrated. In such embodiments, the proximity sensing may be achieved through transcapacitance sensing (or mutual capacitance sensing) based on transcapacitances (or mutual capacitances) between the transmitter electrodes and the sensor electrodes 118, the transcapacitances being determined based on the resulting signals. In other embodiments, the proximity sensing may be achieved through hybrid sensing that is based on both the absolute capacitance sensing and the transcapacitance sensing.

The processing system 200 may be further configured to generate positional information of the input object in the sensing region. "Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time. The generated positional information may be sent to the controller 20.

The operation of the processing system 200 may be controlled based on control signals and/or control data received from the controller 20. The control signals may include sync signals (e.g., an external vertical sync signal and an external horizontal sync signal), a data enable signal, and/or a clock signal. The control data may include commands that indicate desired operations of the processing system 200. In one implementation, the control data may include a mode command that specifies an operation mode of the processing system 200, and the processing system 200 may be configured to be placed into the operation mode as specified by the mode command.

The controller 20 may be configured to embed the image data, the control signals and/or the control data in low-voltage differential signals and provide the differential signals to the processing system 200. The processing system 200 may be configured to reproduce the image data, the control signals and/or the control data from the differential signals.

Figure 3:
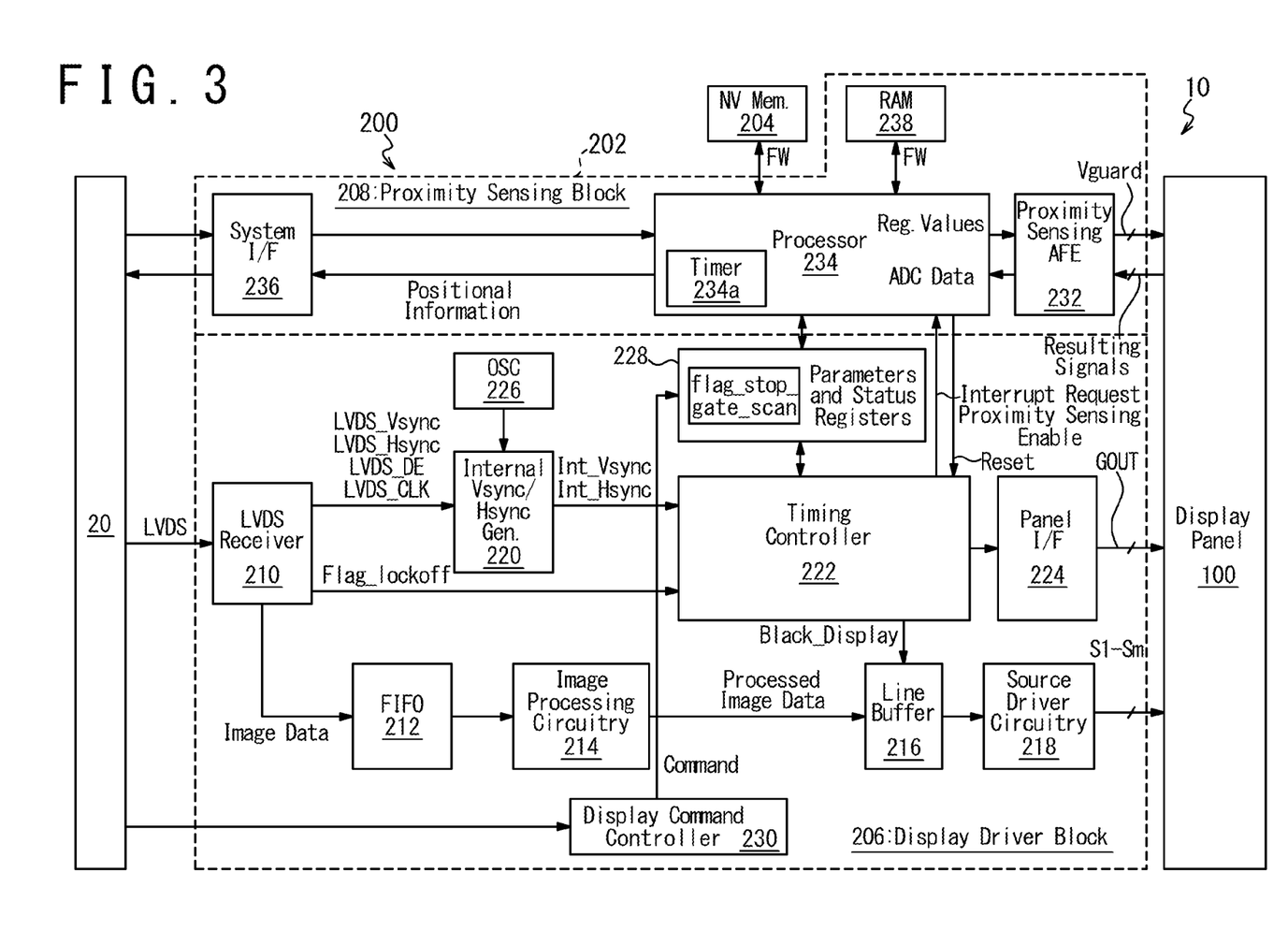
FIG. 3 illustrates an example configuration of a processing system, according to one or more embodiments.

FIG. 3 illustrates an example configuration of the processing system 200 according to one or more embodiments. In the illustrated embodiment, the processing system 200 includes a TDDI 202 and a non-volatile memory 204 configured to store a firmware used to control the TDDI 202. The non-volatile memory 204 may be further configured to store setting parameters, control data and/or other information used to control the TDDI 202. In other embodiments, the non-volatile memory 204 may be incorporated in the TDDI 202. In still other embodiments, components of the TDDI 202 may be distributed in a plurality of integrated circuit (IC) chips.

In the illustrated embodiment, the TDDI 202 includes a display driver block 206 and a proximity sensing block 208. The display driver block 206 is configured to drive or update the display panel 100, and the proximity sensing block 208 configured to detect one or more input objects in the sensing region of the display panel 100 through proximity sensing.

In one or more embodiments, the display driver block 206 includes an LVDS receiver 210, a first-in-first-out (FIFO) circuit 212, image processing circuitry 214, a line buffer 216, source driver circuitry 218, internal Vsync/Hsync generator 220, a timing controller 222, panel interface (I/F) circuitry 224, an oscillator 226, parameters and status registers circuitry 228, and a display command controller 230.

The LVDS receiver 210 is configured to receive the differential signals from the controller 20 and reproduce the image data from the received differential signals. The LVDS receiver 210 is further configured to forward the reproduced image data to the FIFO 212. The LVDS receiver 210 is further configured to reproduce control signals from the differential signals. In one implementation, the reproduced control signals may include an external vertical sync signal LVDS_Vsync, an external horizontal sync signal LVDS_Hsync, a data enable signal LVDS_DE, and a recovered clock signal LVDS_CLK. A different type of receiver may be used to receive signals that carry the image data, the control data, and the control signals in place of the LVDS receiver 210.

In various embodiments, the LVDS receiver 210 includes clock recovery circuitry configured to generate the recovered clock signal LVDS_CLK from the LVDS differential signals through clock recovery. The recovered clock signal LVDS_CLK is "phase-locked" or simply "locked" when the recovered clock signal LVDS_CLK is made synchronous with the LVDS differential signals. The terms "locked" referred herein may mean the state in which the phase of the recovered clock signal LVDS_CLK is stably regulated. The clock recovery circuitry may include, for example, a phase-locked loop (PLL) or a delay-locked loop (DLL).

The LVDS receiver 210 may be further configured to monitor communications between the controller 20 and the processing system 200 and detect a communication failure. Since a communication failure between the controller 20 and the processing system 200 causes the recovered clock signal LVDS_CLK to be "unlocked", the detection of the communication failure may be based on whether the recovered clock signal LVDS_CLK is "unlocked." The term "unlocked" referred herein may mean the state in which the phase of the recovered clock signal LVDS_CLK is unstable. In one implementation, the communication failure between the controller 20 and the processing system 200 may be detected by detecting the "unlocking" of the recovered clock signal LVDS_CLK.

The LVDS receiver 210 may be configured to provide an unlocked state flag flag_lockoff that indicates the unlocking of the recovered clock signal LVDS_CLK to the timing controller 222. The unlocked state flag flag_lockoff may be set in response to the detection of the unlocking of the recovered clock signal LVDS_CLK. The unlocked state flag flag_lockoff may be reset in response to a detection of re-locking of the recovered clock signal LVDS_CLK. Since recovery from the communication failure causes re-locking of the recovered clock signal LVDS_CLK, in one implementation, the recovery from the communication failure may be detected based on the re-locking of the recovered clock signal LVDS_CLK.

The FIFO 212 is configured to receive and store the image data from the LVDS receiver 210. The FIFO 212 is further configured to forward the image data to the image processing circuitry 214 in an FIFO manner.

The image processing circuitry 214 is configured to process the image data received from the FIFO 212 and provide the processed image data to the line buffer 216. The processing performed by the image processing circuitry 214 may include color adjustment, image scaling, gamma transformation, subpixel rendering and/or other processes. In other embodiments, the image data stored in the FIFO 212 may be forwarded to the line buffer 216 without modification.

The line buffer 216 is configured to transfer the processed image data from the image processing circuitry 214 to the source driver circuitry 218 on a "horizontal line" basis, where the horizontal line referred herein corresponds to a set of display elements 112 coupled to one gate line 116 (also see FIG. 2). In one implementation, the line buffer 216 has a capacity to store image data for one horizontal line and is configured to successively update the stored image data with the processed image data successively received from the image processing circuitry 214.

The line buffer 216 is further configured to provide the source driver circuitry 218 with image data specifying graylevels corresponding to "black" for all the display elements 112 of the horizontal line of interest, independently of the processed image data received from the image processing circuitry 214. The line buffer 216 may be configured such that image data specifying the graylevel corresponding to "black" for all the display elements 112 of the horizontal line of interest are set to the line buffer 216 in response to an assertion of a black display instruction signal Black_Display received from the timing controller 222. The line buffer 216 may further provide the source driver circuitry 218 with the image data corresponding to "black" in response to the assertion of the black display instruction signal Black_Display. The graylevel corresponding to "black" may be the minimum graylevel (e.g., zero.) In embodiments where the display panel 100 is an LCD panel, the minimum graylevel may correspond to one of the allowed drive voltages closest to the common voltage Vcom supplied to one or more common electrodes of the LCD panel. In various implementations, a black display on the display panel 100 may be achieved by providing the image data corresponding to "black" to the source driver circuitry 218 by using the line buffer 216, as describe later in detail.

The source driver circuitry 218 is configured to update the display elements 112 of the display panel 100 based on the image data received from the line buffer 216 (e.g., the processed image data or the image data specifying graylevels corresponding to "black" for all the display elements). The source driver circuitry 218 may be configured to update the display elements 112 of the display panel 100 with drive voltages corresponding to the graylevels specified for the respective display elements 112 by the image data received from the line buffer 216.

The internal Vsync/Hsync generator 220 is configured to generate an internal vertical sync signal int_Vsync and an internal horizontal sync signal int_Hsync based on the external vertical sync signal LVDS_Vsync, the external horizontal sync signal LVDS_Hsync, and the recovered clock signal LVDS_CLK. The internal vertical sync signal int_Vsync may define frame periods (or vertical sync periods) during each of which the display elements 112 of the entire display panel 100 are updated. The internal horizontal sync signal int_Hsync may define horizontal sync periods during each of which display elements 112 of one horizontal line are updated. The internal vertical sync signal int_Vsync may be generated in synchronization with the external vertical sync signal LVDS_Vsync, and the internal horizontal sync signal int_Hsync may be generated in synchronization with the external horizontal sync signal LVDS_Hsync. The recovered clock signal LVDS_CLK may be used for clocking in the generation of the internal vertical sync signal int_Vsync and the internal horizontal sync signal int_Hsync.

The timing controller 222 is configured to offer overall control of the processing system 200 in synchronization with the internal vertical sync signal int_Vsync and the internal horizontal sync signal int_Hsync received from the internal Vsync/Hsync generator 220. More specifically, the timing controller 222 may be configured to provide timing control for components disposed in the processing system 200 (e.g., the FIFO 212, the image processing circuitry 214, the line buffer 216, the source driver circuitry 218, the panel interface circuitry 224 and other components). The timing controller 222 may be further configured to generate and provide the black display instruction signal Black_Display to the line buffer 216. The timing controller 222 may be further configured to generate and provide an interrupt request and a proximity sensing enable signal to the proximity sensing block 208.

The panel interface circuitry 224 is configured to generate and provide the gate control signals GOUT to the gate driver circuitry 120 of the display panel 100 under the control of the timing controller 222. In various implementations, the panel interface circuitry 224 may be configured to control start and stop of the scanning of the gate lines 116 with the gate control signals GOUT under the control of the timing controller 222. The scanning of the gate lines 116 may be started by starting driving the gate control signals GOUT and stopped by keeping the signal levels of the gate control signals GOUT unchanged.

The oscillator 226 is configured to generate an internal oscillation signal. As described later in detail, the internal oscillation signal may be used to generate the internal vertical sync signal int_Vsync and the internal horizontal sync signal int_Hsync in cases where the external vertical sync signal LVDS_Vsync and the external horizontal sync signal LVDS_Hsync are not successfully reproduced due to a communication failure between the controller 20 and the processing system 200.

The parameters and status registers circuitry 228 is configured to store parameters, register values, and/or other information used to control the processing system 200. In various implementations, the parameters and status registers circuitry 228 may be configured to store a register value that indicates the operation mode of the processing system 200, and the processing system 200 may be placed in the operation mode specified by the register value. The parameters and status registers circuitry 228 may be further configured to store a gate scan stop flag flag_stop_gate_scan that indicates whether the scanning of the gate lines 116 is currently stopped. The gate scan stop flag flag_stop_gate_scan may be set in response to stop of the scanning of the gate lines 116.

The parameters and status registers circuitry 228 is further configured to provide interface between the display driver block 206 and the proximity sensing block 208. The proximity sensing block 208 may be configured to recognize the status of the display driver block 206 (e.g., whether the scanning of the gate lines 116 is currently stopped) based on one or more register values stored in the parameters and status registers circuitry 228 and control the operation of the display driver block 206 by updating one or more register values stored in the parameters and status registers circuitry 228.

The display command controller 230 is configured to control the overall operation of the processing system 200 based on a command received from the controller 20. The display command controller 230 may be configured to update the parameters and/or register values stored in the parameters and status registers circuitry 228 based on the received command. In one implementation, the display command controller 230 may be configured to control the operation mode of the processing system 200 by updating one or more register values stored in the parameters and status registers circuitry 228 in response a mode command received from the controller 20.

In one or more embodiments, the proximity sensing block 208 includes a proximity sensing analog front end (AFE) 232, a processor 234, system interface (I/F) circuitry 236, and a random access memory 238. The proximity sensing AFE 232 is configured to receive resulting signals from the sensor electrodes 118 and generate analog-to-digital conversion (ADC) data corresponding to the resulting signals. Generating the ADC data may include conditioning (filtering, baseline compensation, and/or other analog processing) of the resulting signals and analog-to-digital conversion of the conditioned resulting signals. In embodiments where the resulting signals from the sensor electrodes 118 are acquired in a time divisional manner, the proximity sensing AFE 232 may be configured to provide guarding voltage Vguard to sensor electrodes 118 from which resulting signals are not currently acquired. In embodiments where the proximity sensing is achieved through transcapacitive sensing, the proximity sensing AFE 232 may be configured to provide transmitter signals to transmitter electrodes disposed in the sensing region of the display panel 100. The operation of the proximity sensing AFE 232 may be controlled based on one or more register values received from the processor 234.

The processor 234 is configured to generate positional information of one or more input objects in the sensing region of the display panel 100 based on the resulting signals acquired from the sensor electrodes 118. In one implementation, the processor 234 may be configured to process the ADC data, which correspond to the resulting signals acquired from the sensor electrodes 118, to generate the positional information. Examples of the processor 234 include a micro control unit (MCU), a central processing unit (CPU) and other types of processors.

The processor 234 may be further configured to control the overall operation of the proximity sensing block 208. More specifically, the processor 234 may be configured to perform proximity sensing to detect one or more input object in response to an assertion of the proximity sensing enable signal received from the timing controller 222. The processor 234 may be configured to control the proximity sensing AFE 232 by providing register values to the proximity sensing AFE 232.

The processor 234 may be further configured to control the operation of the display driver block 206. More specifically, the processor 234 may be configured to receive an interrupt request from the timing controller 222 of the display driver block 206 and access the parameters and status registers circuitry 228 in response to the interrupt request to recognize the current status of the display driver block 206 by referring to one or more register values stored in the parameters and status registers circuitry 228. The processor 234 may be further configured to control the operation mode of the display driver block 206 based on the recognized current status.

The processor 234 may include a timer 234a. The timer 234a may be a hardware-based timer or a software-based timer. As described later in detail, the timer 234a may be used to detect expiration of a predetermined time limit after a detection of a communication failure between the controller 20 and the processing system 200. In one implementation, the timer 234a may include a counter configured to start counting in response to the detection of the communication failure. In such embodiments, the timer 234a may be configured to detect the expiration of the time limit based on occurrence of an overflow of the counter.

The operation of the processor 234 may be based on the firmware stored in the non-volatile memory 204. In one implementation, the processor 234 may be configured to retrieve program codes of the firmware upon start-up and/or reset of the processing system 200 and store the program codes in the RAM 238. The processor 234 may be further configured to execute the program codes stored in the RAM 238.

The system interface (I/F) circuitry 236 is configured to provide interface between the controller 20 and the processor 234. The system interface circuitry 236 may be configured to forward the positional information from the processor 234 to the controller 20. The system interface circuitry 236 may be further configured to forward instructions from the controller 20 to the processor 234.

Figure 4:
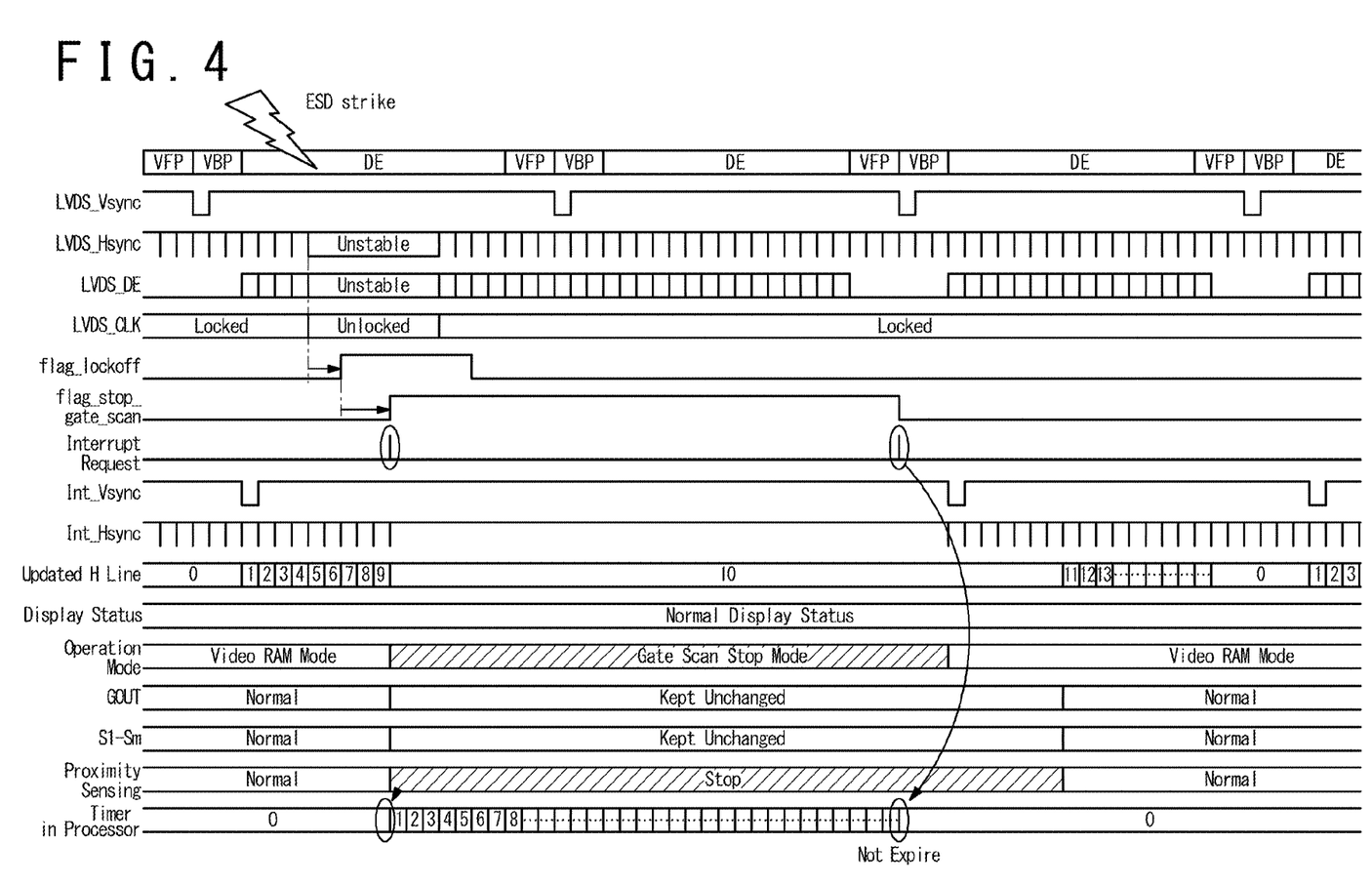
FIG. 4 illustrates an example operation of the processing system, according to one or more embodiments.

FIG. 4 illustrated an example operation of the processing system 200 in the case where an ESD strike occurs, according to one or more embodiments. In FIG. 4 (and other figures), "VBP" stands for a vertical back porch period that starts upon an assertion of the external vertical sync signal LVDS_Vsync, "DE" stands for a display update period that follows the vertical back porch period, and "VFP" stands for a vertical front porch period that follows the display update period. The display update period may be a period during which image data for the display elements 112 are transferred from the controller 20 to the processing system 200. The numbers in the "Updated H Line" section indicate the horizontal line which is being updated. The number "0" in the "Updated H Line" section indicates that the horizontal line identified by the horizontal line identification (ID) "0" is being updated, and the number "1" in the "Updated H Line" section indicates that the horizontal line identified by the horizontal line ID "1" is being updated. The same goes for other numbers in the "Updated H Line" section.

Initially, the processing system 200 is placed in a video RAM mode (or a first mode) in which the processing system 200 updates the display elements 112 of the display panel 100 based on a stream of image data received from the controller 20.

In the embodiment illustrated in FIG. 4, the ESD strike causes a short-term communication failure between the controller 20 and the processing system 200, where the period of the communication failure falls in one frame period. The communication failure may cause unsuccessful reproduction of the image data and also cause unlocking of the recovered clock signal LVDS_CLK, resulting in unsuccessful reproduction of the external horizontal sync signal LVDS_Hsync and the data enable signal LVDS_DE. The unlocking of the recovered clock signal LVDS_CLK is indicated by "Unlocked" in FIG. 4. The unsuccessful reproduction of the image data, the external horizontal sync signal LVDS_Hsync and the data enable signal LVDS_DE may potentially cause display of a corrupted image on the display panel 100.

The LVDS receiver 210 detects the communication failure caused by ESD strike. In the embodiment illustrated in FIG. 4, in response to the detection of the communication failure between the controller 20 and the processing system 200, the timing controller 222 causes the panel interface circuitry 224 to stop scanning of the gate lines 116 of the display panel 100. The stop of the scanning of the gate lines 116 causes the display image to remain unchanged, avoiding a corrupted image being displayed on the display panel 100.

More specifically, in one implementation, the LVDS receiver 210 may detect the unlocking of the recovered clock signal LVDS_CLK and set the unlocked state flag flag_lockoff in response to the detection of the unlocking. The timing controller 222 may place the processing system 200 into a gate scan stop mode (or a second mode) in response to the unlocked state flag flag_lockoff being set. Placing the processing system 200 into the gate scan stop mode may include setting the gate scan stop flag flag_stop_gate_scan stored in the parameters and status registers circuitry 228. In response to the processing system 200 being placed into the gate scan stop mode, the panel interface circuitry 224 may keep the signal levels of the gate control signals GOUT unchanged, causing the gate driver circuitry 120 of the display panel 100 to stop scanning of the gate lines 116.

The timing controller 222 further may cause the source driver circuitry 218 to stop outputting the drive voltages in response to the processing system 200 being placed into the gate scan stop mode. In one implementation, the source driver circuitry 218 may keep the voltage levels on the source outputs S1 to Sm unchanged in response to the processing system 200 being placed into the gate scan stop mode.

The timing controller 222 may further cause the proximity sensing block 208 to stop the proximity sensing in the gate scan stop mode. In one implementation, the timing controller 222 may deassert the proximity sensing enable signal in the gate scan stop mode, and the processor 234 may stop the proximity sensing in response to the deassertion of the proximity sensing enable signal.

Meanwhile, the processor 234 starts the timer 234a, which has a predetermined time limit, in response to the detection of the communication failure between the controller 20 and the processing system 200. In one implementation, the timing controller 222 may issue an interrupt request to the processor 234 and thereby prompt the processor 234 to access the parameters and status registers circuitry 228. The processor 234 may recognize that the gate scan stop flag flag_stop_gate_scan stored in the parameters and status registers circuitry 228 is set and start the timer 234a in response to the gate scan stop flag flag_stop_gate_scan being set.

In the operation illustrated in FIG. 4, the communication failure is recovered before expiration of the time limit set on the timer 234a, since the communication failure, which results from the ESD strike, lasts only for a short time (e.g., within one frame period). In response to the recovery from the communication failure, the timing controller 222 causes the processing system 200 to resume updating the display elements 112 of the display panel 100 based on the image data.

More specifically, in one implementation, the LVDS receiver 210 may detect the recovery from the communication failure based on detection of re-locking of the recovered clock signal LVDS_CLK. In response to the detection of the re-locking of the recovered clock signal LVDS_CLK, the LVDS receiver 210 may reset the unlocked state flag flag_lockoff, and the timing controller 222 may return the processing system 200 from the gate scan stop mode to the video RAM mode (or the first mode) in response to the unlocked state flag flag_lockoff being reset. In the embodiment illustrated in FIG. 4, the gate scan stop mode lasts during the rest of the frame period in which the communication failure is detected and the next frame period, and the processing system 200 returns to the video RAM mode at the beginning of the second next frame period to the frame period in which the communication failure is detected.

Returning the processing system 200 to the video RAM mode may include resetting the gate scan stop flag flag_stop_gate_scan stored in the parameters and status registers circuitry 228. In response to the gate scan stop flag flag_stop_gate_scan being reset, the panel interface circuitry 224 may resume driving the gate control signals GOUT, causing the gate driver circuitry 120 of the display panel 100 to resume scanning of the gate lines 116. The timing controller 222 may further cause the source driver circuitry 218 to resume outputting the drive voltages to the display elements 112 based on the processed image data received from the line buffer 216 in response to the processing system 200 being placed into the video RAM mode. The resuming of the scanning of the gate lines 116 and the outputting of the drive voltages to the display elements 112 achieves resuming the updates of the display elements 112 based on the image data received from the controller 20.

The timing controller 222 may further cause the proximity sensing block 208 to resume the proximity sensing in response to the recovery from the communication failure. In one implementation, the timing controller 222 may assert the proximity sensing enable signal in response to the unlocked state flag flag_lockoff being reset, and the processor 234 may resume the proximity sensing in response to the assertion of the proximity sensing enable signal.

It is noted that the processing system 200 may perform the same operation as illustrated in FIG. 4 when a short-time communication failure resulting from a cause other than the ESD strike (e.g., noise or other type of interference) occurs.

Figure 5:
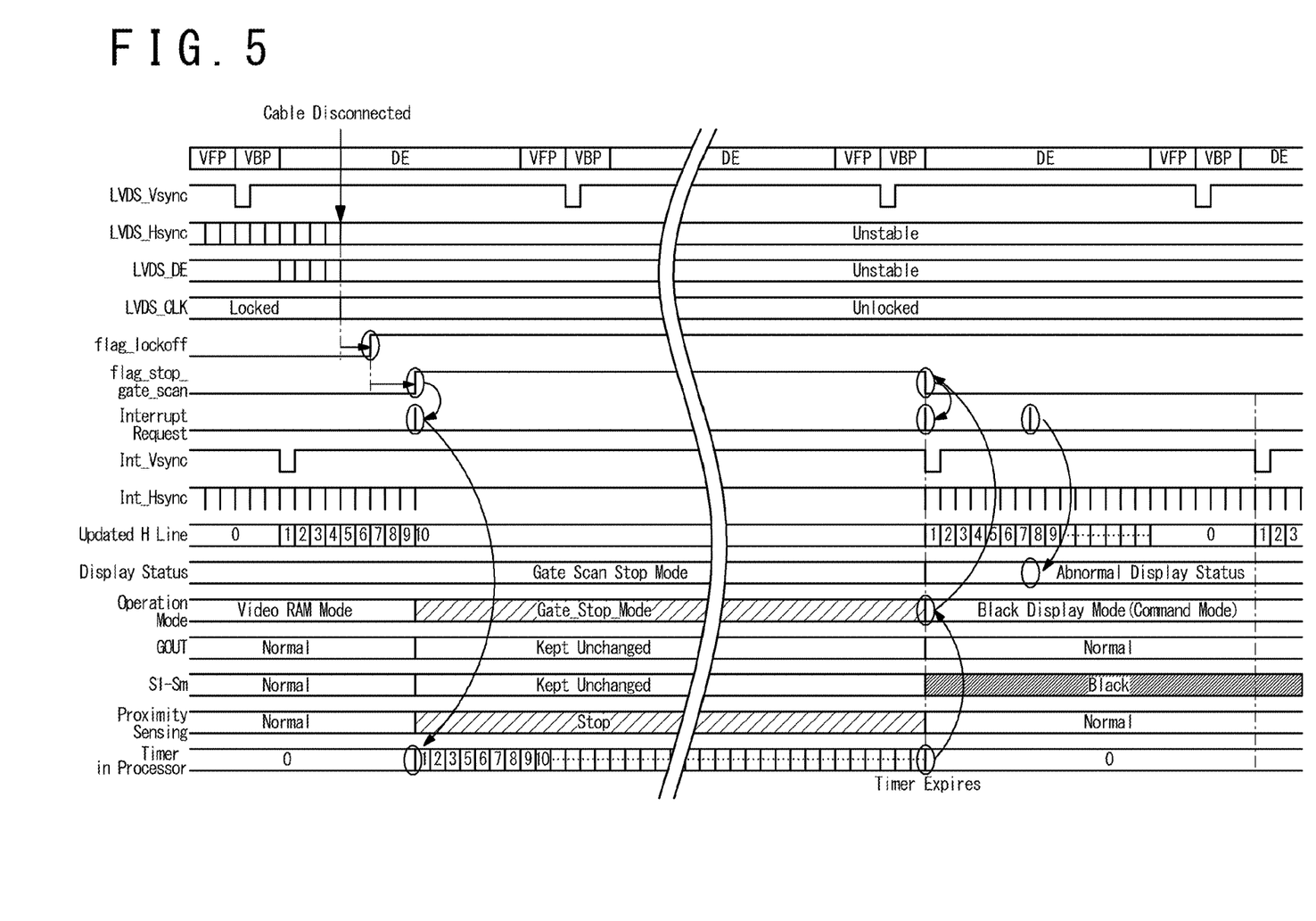
FIGS. 5 and 6 illustrate an example operation of the processing system, according to one or more embodiments.

FIG. 5 illustrates an example operation of the processing system 200 in the case where the physical cable 12 is disconnected from the display device 10 and/or the controller 20, according to one or more embodiments. The disconnection of the physical cable 12 causes a communication failure between the controller 20 and the processing system 200 and therefore the processing system 200 operates similarly as described in relation to FIG. 4. More specifically, in response to the detection of the communication failure between the controller 20 and the processing system 200, the timing controller 222 may place the processing system 200 into the gate scan stop mode and cause the panel interface circuitry 224 to stop scanning of the gate lines 116 of the display panel 100. The timing controller 222 may further cause the source driver circuitry 218 to stop outputting the drive voltages in the gate scan stop mode. In one implementation, the source driver circuitry 218 may keep the voltage levels on the source outputs S1 to Sm unchanged in response to the processing system 200 being placed into the gate scan stop mode. The timing controller 222 may further cause the proximity sensing block 208 to stop the proximity sensing in the gate scan stop mode. Meanwhile, the processor 234 starts the timer 234a in response to the detection of the communication failure between the controller 20 and the processing system 200.

It is noted that the disconnection of the physical cable 12 from the display device 10 and/or the controller 20 possibly causes a long-term communication failure which may last for several minutes or longer. Under such situations, stopping the scanning of the gate lines 116 may cause deterioration (e.g., burn-in) of the display panel 100 due to charge retention in the display elements 112 of the display panel 100.

To avoid the deterioration of the display panel 100 potentially caused by the charge retention, as illustrated in the right part of FIG. 5, the processing system 200 is configured to update the display elements 112 of the display panel 100 to cause a black display in response to expiration of a predetermined time limit after the detection of the communication failure. In embodiments where the timer 234a has the time limit and the processor 234 is configured to start the timer 234a in response to the detection of the communication failure, the updating of the display elements 112 to cause the black display may be responsive to an elapse of the timer 234a. Updating the display elements 112 to cause the black display may discharge at least part of charges retained by the display elements 112, suppressing or avoiding the deterioration of the display panel 100. The time limit may be preset such that the deterioration of the display elements 112 is effectively suppressed or avoided.

In one implementation, in response to expiration of the time limit set on the timer 234a, the processor 234 may switch the operation mode of the processing system 200 from the gate scan stop mode to a black display mode (or a third mode). The black display mode may be one of command modes. The command mode referred herein may be an operation mode in which the processing system 200 is controlled by commands issued by the controller 20 and/or the processor 234. The switching of the operation mode from the gate scan stop mode to the black display mode may be achieved by updating one or more register values stored in the parameters and status registers circuitry 228, the one or more register values specifying the operation mode of the processing system 200.

In response to the processing system 200 being placed into the black display mode, the timing controller 222 may further deassert the gate scan stop flag flag_stop_gate_scan to resume scanning of the gate lines 116. It is noted that the external vertical sync signal LVDS_Vsync and the external horizontal sync signal LVDS_Hsync are not being successfully reproduced at this moment due to the communication failure. Accordingly, the timing controller 222 may cause the internal Vsync/Hsync generator 220 to generate the internal vertical sync signal int_Vsync and the internal horizontal sync signal int_Hsync using the internal oscillator 226 disposed in the processing system 200 without control from the controller 20. The panel interface circuitry 224 may generate and provide the gate control signals GOUT to the gate driver circuitry 120 of the display panel 100 in synchronization with the internal vertical sync signal int_Vsync and the internal horizontal signal int_Hsync thus generated in response to the deassertion of the gate scan stop flag flag_stop_gate_scan, causing the gate driver circuitry 120 resume scanning of the gate lines 116.

The timing controller 222 may further set a display status register value stored in the parameters and status registers circuitry 228, which is indicated by "Display Status" in FIG. 5 (and other figures), to a value that indicates an abnormal display state that represents that the display device 10 is not currently normally displaying an image on the display panel 100. The timing controller 222 may further issue an interrupt request to the processor 234. The processor 234 may access the parameters and status registers circuitry 228 and recognize the display status register value.

The timing controller 222 may further control the source driver circuitry 218 to achieve the black display on the display panel 100 while the gate lines 116 are scanned. In one implementation, the timing controller 222 may further assert the black display instruction signal Black_Display in the black display mode to cause the line buffer 216 to provide image data corresponding to "black" to the source driver circuitry 218. The source driver circuitry 218 may output drive voltages corresponding to "black" to the display elements 112 of the display panel 100 as specified by the image data received from the line buffer 216. As a result, the display elements 112 of the display panel 100 are updated to achieve the black display on the display panel 100.

In other embodiments in which the display panel 100 is an LCD panel, the black display may be achieved by causing the source driver circuitry 218 to output the common voltage Vcom to the display elements 112 while the gate lines 116 are being scanned. The common voltage Vcom may be a voltage supplied to one or more common electrodes of the LCD panel. In embodiments where the sensor electrodes 118 are used as the common electrodes, the common voltage Vcom may be provided to the sensor electrodes 118 while the display elements 112 are updated.

The timing controller 222 may further cause the proximity sensing block 208 to resume the proximity sensing in response to the processing system 200 being placed into the black display mode. In one implementation, the timing controller 222 may assert the proximity sensing enable signal in the black display mode, and the processor 234 may resume the proximity sensing in response to the assertion of the proximity sensing enable signal. Resuming the proximity sensing allows the processing system 200 to receive a user input and respond to the user input in the black display mode.

The black display is continued until the communication failure is recovered. In embodiments where the communication failure results from disconnection of the physical cable 12 from the display device 10 and/or the controller 20, the communication failure may be recovered by connecting the physical cable 12 to the display device 10 and/or the controller 20.

Figure 6:
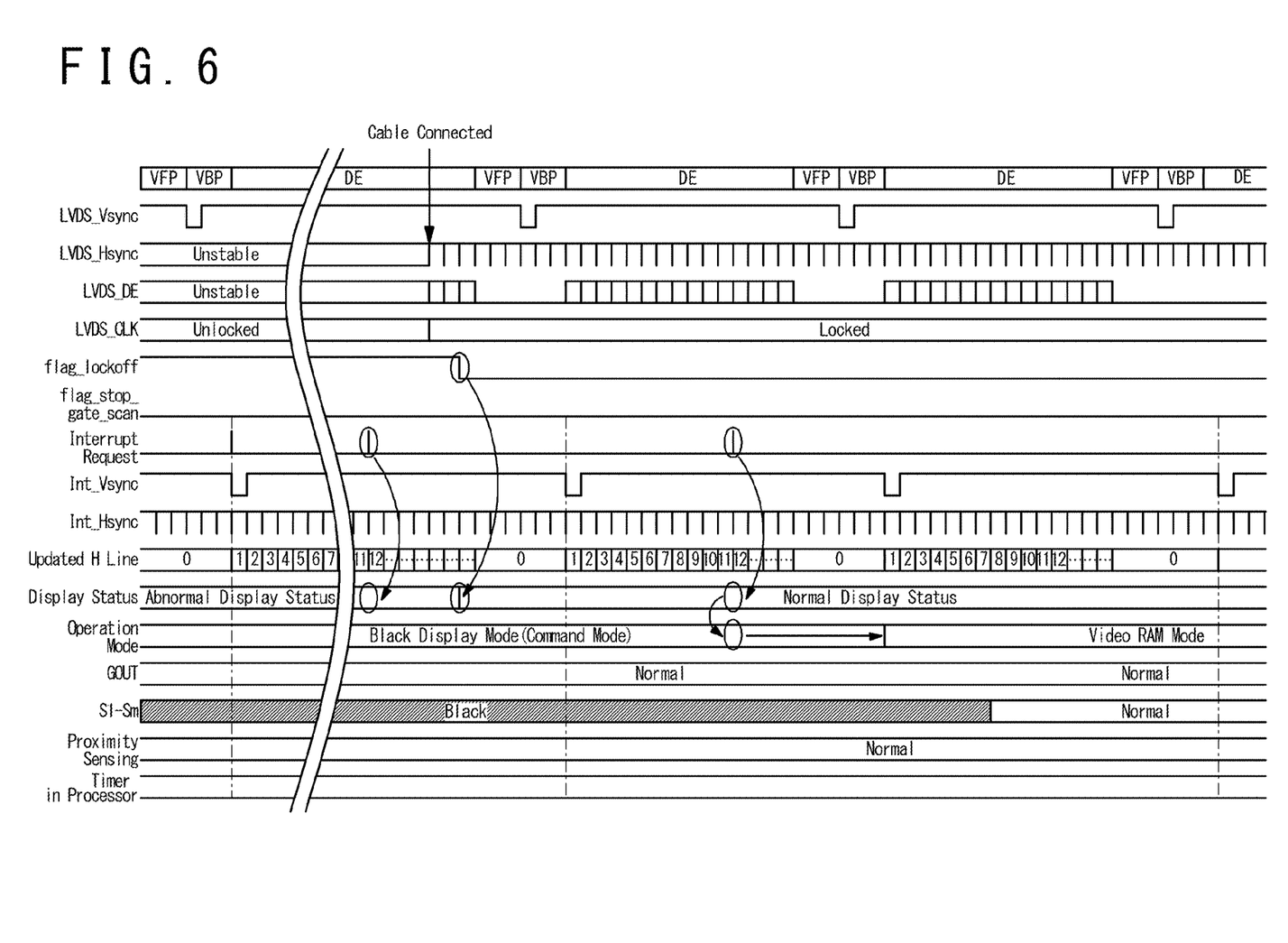

FIG. 6 illustrates an example operation of the processing system 200 in the case where the communication failure is recovered by connecting the physical cable 12 to the display device 10 and the controller 20 while the processing system 200 is in the black display mode, according to one or more embodiments. In response to the recovery from the communication failure, the timing controller 222 causes the processing system 200 to resume updating the display elements 112 of the display panel 100 based on the image data received from the controller 20. More specifically, the LVDS receiver 210 may detect the recovery from the communication failure based on detection of re-locking of the recovered clock signal LVDS_CLK. In response to the detection of the re-locking of the recovered clock signal LVDS_CLK, the LVDS receiver 210 may reset the unlocked state flag flag_lockoff, and the timing controller 222 may return the processing system 200 from the black display mode (or the third mode) to the video RAM mode (or the first mode) in response to the unlocked state flag flag_lockoff being reset. The timing controller 222 may set the display status register value stored in the parameters and status registers circuitry 228 to the value that indicates the normal display state. The timing controller 222 may further issues an interrupt request to the processor 234. The processor 234 may access the parameters and status registers circuitry 228 in response to the interrupt request and recognize the display status register value. In response to the display status register value being set to the value that indicates the normal display state, the processor 234 may switch the processing system 200 from the black display mode to the video RAM mode. The timing controller 222 may further deassert the black display instruction signal in response to the processing system 200 being placed into the video RAM mode to allow the line buffer 216 to receive the processed image data from the image processing circuitry 214. The line buffer 216 may start providing the processed image data to the source driver circuitry 218, allowing the source driver circuitry 218 to resume outputting the drive voltages to the display elements 112 based on the image data received from the controller 20.

It is noted that the processing system 200 may perform the same operation as illustrated in FIGS. 5 and 6 when a long-time communication failure resulting from a cause other than the disconnection of the physical cable 12 (e.g., noise or other type of interference) occurs.

Figure 7:
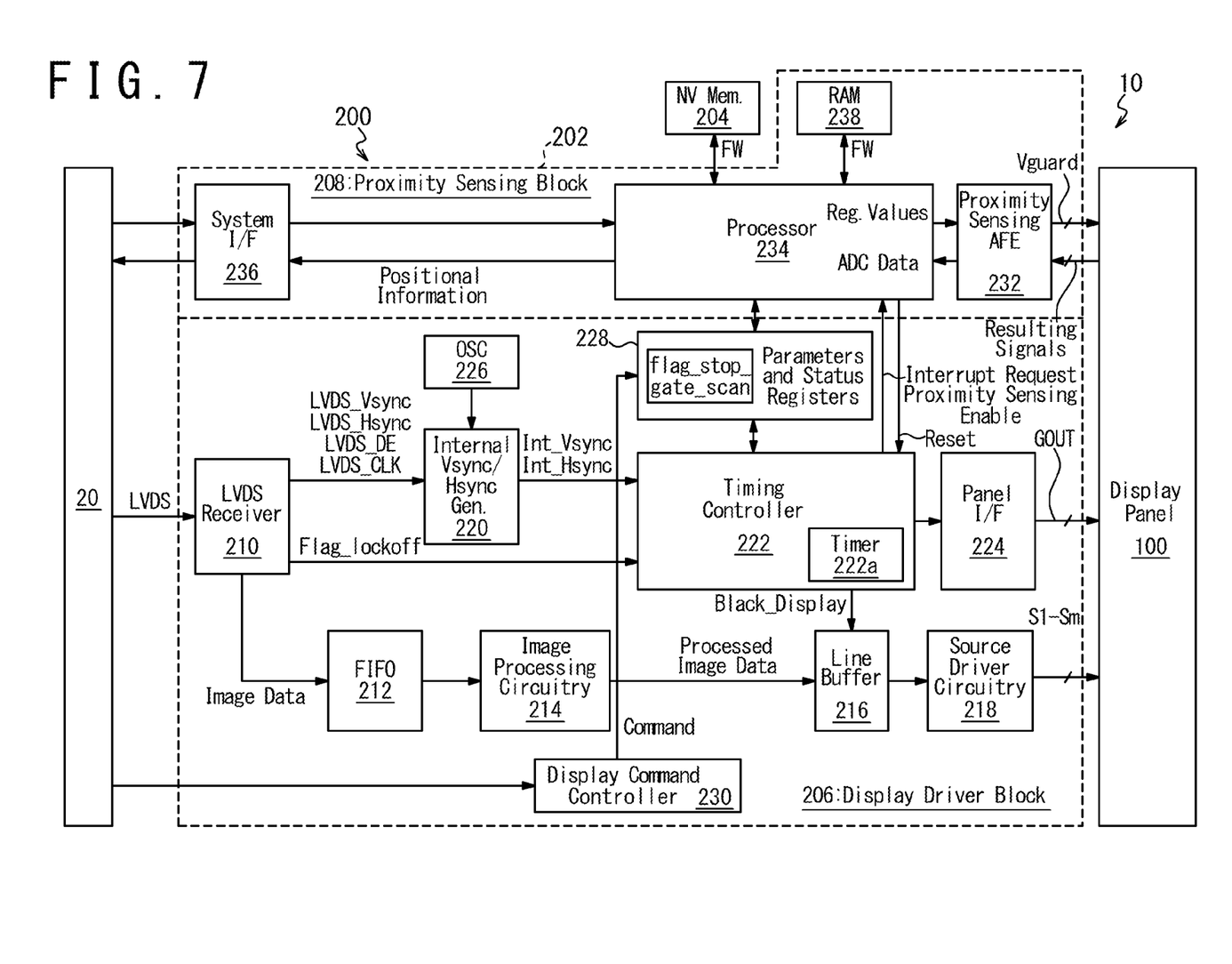
FIG. 7 illustrates another example configuration of the processing system, according to other embodiments.

FIG. 7 illustrates an example configuration of the processing system 200, according to other embodiments. In the embodiment illustrated in FIG. 7, the timing controller 222 includes a timer 222a having a predetermined time limit, while the rest of the processing system 200 of FIG. 7 is configured similarly to the processing system 200 of FIG. 3.

In one implementation, the timing controller 222 may be configured to switch the operation mode of the processing system 200 from the gate scan stop mode to the black display mode using the timer 222a. The timing controller 222 may be configured to start the timer 222a in response to a detection of the communication failure between the controller 20 and the processing system 200. The timing controller 222 may be further configured to switch the operation mode of the processing system 200 from the gate scan stop mode to the black display mode in response to expiration of a time limit after the detection of the communication failure. In embodiments where the timer 222a has the time limit, the switching of the operation mode from the gate scan stop mode to the black display mode may be responsive to an elapse of the timer 222a. The switching of the operation mode may include setting the gate scan stop flag flag_stop_gate_scan. The timing controller 222 may be further configured to switch the operation mode from the black display mode to the video RAM mode in response to the detection of recovery from the communication failure.

Figure 8:
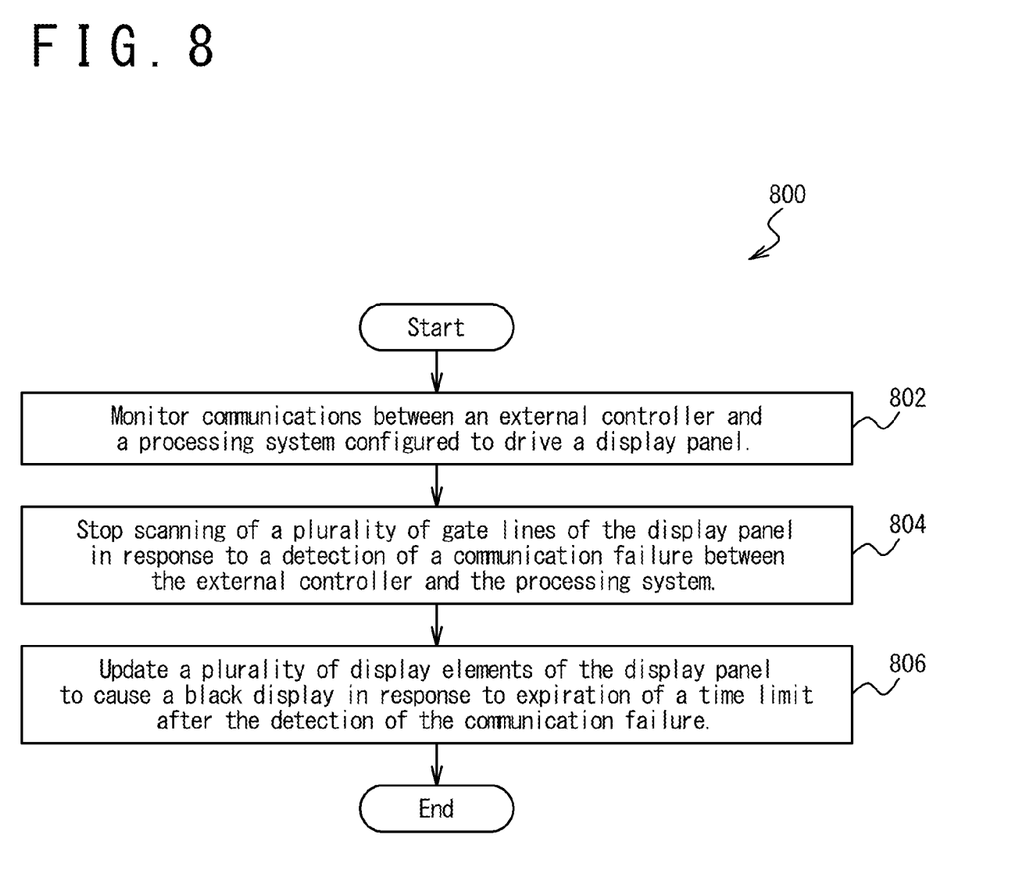
FIG. 8 illustrates an example method of driving a display panel, according to one or more embodiments.

Method 800 of FIG. 8 illustrates steps for driving a display panel (e.g., the display panel 100 illustrated in FIGS. 1 and 2). At step 802, a processing system configured to drive a display panel (e.g., the processing system 200 illustrated in FIGS. 2 and 3) monitors communications between an external controller (e.g., the controller 20 illustrated in FIGS. 1 to 3) and the processing system. At step 804, the processing system stops scanning of a plurality of gate lines (e.g., the gate lines 116) of the display panel in response to a detection of a communication failure between the external controller and the processing system. Stopping the scanning of the gate lines may allow keeping the display image unchanged on the display panel, avoiding the display panel being updated with a corrupted image. At step 806, the processing system updates a plurality of display elements (e.g., the display elements 112 illustrated in FIG. 2) of the display panel to cause a black display in response to expiration of a time limit after the detection of the communication failure. Updating the display elements to cause the black display may discharge at least part of charges retained by the display elements, effectively suppressing the deterioration of the display panel.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A processing system, comprising:
a timing controller configured to:
stop scanning of a plurality of gate lines of a display panel in response to a detection of a communication failure between the processing system and a controller,
stop proximity sensing in response to the detection of the communication failure, and
resume the proximity sensing in response to expiration of a time limit after the detection of the communication failure; and
source driver circuitry configured to update a plurality of display elements of the display panel to cause a black display in response to the expiration of the time limit after the detection of the communication failure.

2. The processing system of claim 1, wherein the timing controller is further configured to resume the scanning of the plurality of gate lines in response to recovery from the communication failure before the expiration of the time limit.

3. The processing system of claim 1, wherein the timing controller is further configured to resume the scanning of the plurality of gate lines in response to the expiration of the time limit.

4. The processing system of claim 3, wherein resuming the scanning of the plurality of gate lines comprises:
generating an internal vertical sync signal and an internal horizontal sync signal in the processing system by using an oscillator incorporated in the processing system without control from the controller; and
controlling gate driver circuitry to scan the plurality of gate lines in synchronization with the internal vertical sync signal and the internal horizontal sync signal.

5. The processing system of claim 1, wherein updating the plurality of display elements of the display panel to cause the black display comprises:
    updating the plurality of display elements with drive voltages corresponding to black.

6. The processing system of claim 1, wherein the source driver circuitry is further configured to:
    in response to recovery from the communication failure after the expiration of the time limit, update the plurality of display elements based on image data.

7. The processing system of claim 1, further comprising a processor configured to generate positional information of an input object based on a resulting signal acquired from a sensor electrode of the display panel.

8. The processing system of claim 1, further comprising a processor configured to:
    start a timer having the time limit in response to the detection of the communication failure; and
    determine an elapse of the timer.

9. The processing system of claim 8, wherein starting the timer comprises starting the timer based on a firmware executed by the processor.

10. A display device, comprising:
    a display panel comprising:
        a plurality of display elements; and
        a plurality of gate lines; and
    a processing system comprising:
        a timing controller configured to:
            stop scanning of the plurality of gate lines in response to a detection of a communication failure between the processing system and a controller,
            stop proximity sensing in response to the detection of the communication failure, and
            resume the proximity sensing in response to expiration of a time limit after the detection of the communication failure; and
        source driver circuitry configured to update the plurality of display elements to cause a black display in response to the expiration of the time limit after the detection of the communication failure.

11. The display device of claim 10, wherein the timing controller is further configured to resume the scanning of the plurality of gate lines in response to the expiration of the time limit.

12. The display device of claim 11, wherein resuming the scanning of the plurality of gate lines comprises:
    generating an internal vertical sync signal and an internal horizontal sync signal in the processing system by using an oscillator incorporated in the processing system without control from the controller; and
    controlling gate driver circuitry to scan the plurality of gate lines in synchronization with the internal vertical sync signal and the internal horizontal sync signal.

13. The display device of claim 10, wherein updating the plurality of display elements of the display panel to cause the black display comprises:
    updating the plurality of display elements with drive voltages corresponding to black.

14. The display device of claim 10, wherein the source driver circuitry is further configured to:
    in response to recovery from the communication failure after the expiration of the time limit, update the plurality of display elements based on image data.

15. The display device of claim 10, wherein the processing system further comprises a processor configured to generate positional information of an input object based on a resulting signal acquired from a sensor electrode of the display panel.

16. The display device of claim 10, wherein the processing system further comprises a processor configured to:
    start a timer having the time limit in response to the detection of the communication failure; and
    determine an elapse of the timer.

17. The display device of claim 16, further comprising a non-volatile memory configured to store a firmware executed by the processor,
    wherein starting the timer comprises starting the timer based on the firmware.

18. A method, comprising:
    stopping scanning of a plurality of gate lines of a display panel in response to a detection of a communication failure between a controller and a processing system configured to drive the display panel;
    stopping proximity sensing in response to the detection of the communication failure;
    resuming the proximity sensing in response to expiration of a time limit after the detection of the communication failure; and
    updating a plurality of display elements of the display panel to cause a black display in response to the expiration of the time limit after the detection of the communication failure.

* * * * *